United States Patent
Gebhart et al.

(10) Patent No.: US 8,887,158 B2
(45) Date of Patent: Nov. 11, 2014

(54) DYNAMIC CLUSTER EXPANSION THROUGH VIRTUALIZATION-BASED LIVE CLONING

(75) Inventors: Alexander Gebhart, Akazienweg (DE); Erol Bozak, Vinzentiusstrasse (DE)

(73) Assignee: SAP SE, Walldorf (DE)

( * ) Notice: Subject to any disclaimer, the term of this patent is extended or adjusted under 35 U.S.C. 154(b) by 1084 days.

(21) Appl. No.: 12/044,888

(22) Filed: Mar. 7, 2008

(65) Prior Publication Data
US 2009/0228883 A1 Sep. 10, 2009

(51) Int. Cl.
*G06F 9/48* (2006.01)
*G06F 9/455* (2006.01)

(52) U.S. Cl.
CPC ................. *G06F 9/45533* (2013.01)
USPC .............................. 718/100; 718/1

(58) Field of Classification Search
USPC ...................................... 718/1, 100
See application file for complete search history.

(56) References Cited

U.S. PATENT DOCUMENTS

| | | | |
|---|---|---|---|
| 7,010,717 B2 * | 3/2006 | Whitlow ..................... | 714/4.11 |
| 7,225,356 B2 * | 5/2007 | Monitzer ..................... | 714/12 |
| 7,299,468 B2 * | 11/2007 | Casey et al. .................. | 718/104 |
| 7,428,655 B2 * | 9/2008 | Pomaranski et al. ........... | 714/3 |
| 7,590,737 B1 * | 9/2009 | Chen et al. ................... | 709/226 |
| 7,685,251 B2 * | 3/2010 | Houlihan et al. ............. | 709/215 |
| 7,830,838 B2 * | 11/2010 | Kohvakka et al. ............ | 370/330 |
| 7,882,216 B2 * | 2/2011 | Houlihan et al. ............. | 709/224 |
| 8,091,084 B1 * | 1/2012 | Dobrovolskiy et al. ....... | 717/174 |
| 2004/0068667 A1 * | 4/2004 | Kumhyr et al. ............... | 713/201 |
| 2005/0246453 A1 * | 11/2005 | Erlingsson et al. ............ | 710/1 |
| 2006/0053216 A1 * | 3/2006 | Deokar et al. ................ | 709/223 |
| 2006/0155912 A1 * | 7/2006 | Singh et al. .................. | 711/6 |
| 2007/0043860 A1 * | 2/2007 | Pabari ......................... | 709/224 |
| 2007/0074208 A1 * | 3/2007 | Ling et al. ................... | 718/1 |
| 2007/0106993 A1 * | 5/2007 | Largman et al. .............. | 718/104 |
| 2008/0163207 A1 * | 7/2008 | Reumann et al. ............. | 718/1 |
| 2008/0222729 A1 * | 9/2008 | Chen et al. ................... | 726/24 |
| 2008/0271016 A1 * | 10/2008 | Chess et al. .................. | 718/1 |
| 2008/0320269 A1 * | 12/2008 | Houlihan et al. ............. | 711/203 |
| 2009/0144800 A1 * | 6/2009 | Black-Ziegelbein et al. .. | 726/1 |
| 2009/0182928 A1 * | 7/2009 | Becker et al. ................ | 711/6 |
| 2009/0183173 A1 * | 7/2009 | Becker et al. ................ | 719/313 |

OTHER PUBLICATIONS

Ashish Gupta et al., "Inferring the topology and traffic load of parallel programs running in a virtual machine environment", Job Scheduling Strategies for Parallel Processing, 10th International Workshop, JSSPP 2004, New York, NY, USA, Jun. 13, 2004, pp. 1-19.

(Continued)

*Primary Examiner* — Aimee Li
(74) *Attorney, Agent, or Firm* — Mintz Levin Cohn Ferris Glovsky and Popeo, P.C.

(57) ABSTRACT

Methods and apparatus, including computer program products, are provided for transitioning one or more aspect of a dynamic cluster of computers to one or more virtual machines. In one aspect, there is provided a computer-implemented method. The method may include receiving a selection representing a node of a cluster selected for cloning. An indication may be provided to the node to prepare for cloning. The indication may be provided by accessing an interface at the node. When the selection is received and the node is prepared for cloning, the cloning of the node may be initiated. In some implementations, the node comprises a virtual machine including an application. Related apparatus, systems, methods, and articles are also described.

19 Claims, 5 Drawing Sheets

(56) References Cited

OTHER PUBLICATIONS

Paul M. Ruth, "Adaptive virtual distributed environments for shared cyberinfrastructures", A Dissertation Submitted to the Faculty of Purdue University, Aug. 2007, pp. 1-126.

Wenzhang Zhu et al., "Distributed Java Virtual Machine with Transparent Thread Migration Support", IEEE Fourth International Conference on Cluster Computing, 2002, pp. 1-8.

Ingard Mevag, "Towards Automatic Management and Live Migration of Virtual Machines", Master's thesis, University of Oslo, Oslo University College, (UiO /HiO), Oslo, Norway, May 2007, pp. 1-107.

* cited by examiner

DYNAMIC CLUSTER EXPANSION THROUGH VIRTUALIZATION-BASED LIVE CLONING

FIELD

The present disclosure generally relates to distributed computing systems. More particularly, the present disclosure relates to cloning, i.e., copying, a virtual machine to expand a cluster.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications, including games.

Some attribute the popularity of computers to the Internet. The Internet provides people with a ready access to vast amounts of data. Many people now get their news, sports, stock, entertainment, and other information primarily from the Internet. But businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Today, distributed computing systems are widely used by various organizations to accommodate the ever-increasing demand for the computer resources from consumers and businesses alike. In a distributed computing system, nodes (e.g., computers, processors, servers, etc.) are grouped or clustered to perform certain functions. Generally, a cluster is a collection of computer nodes that work together to perform a function, so that in many respects the cluster can be viewed as a single computer. The nodes of a cluster are usually coupled by a network, such as the Internet or an intranet. The cluster may be managed dynamically.

A dynamic cluster is a cluster system that is managed by a controller (or manager) that dynamically optimizes the performance of the cluster. Moreover, a dynamic cluster (specifically, its controller) may start and stop individual instances of application servers as required. A dynamic cluster may also dynamically balance the workloads of the nodes of the cluster based on performance information collected from cluster nodes. As a consequence, dynamic clusters optimize the use of the processing capabilities of the computers in the clusters. When compared to a single computer hosting a single application server, the dynamic cluster may provide increased performance and overall lower total cost of ownership by better utilizing the existing processing capabilities of the cluster.

One example of a dynamic cluster system is provided by SAP, AG's NetWeaver Adaptive Computing infrastructure. The Adaptive Computing infrastructure enables the dynamic assignment of hardware resources to serve specific application services. In this way, SAP NetWeaver enables an Adaptive Computing infrastructure to provide business solutions based on SAP NetWeaver running at peak efficiency. In most cases, SAP's Adaptive Computing provides lower total cost of ownership by optimizing processing (e.g., better server utilization).

Virtualization technology provides another mechanism for optimizing processing. Virtualization technology provides a software layer that when executed allows multiple virtual machines with, in some cases, different operating systems to run side-by-side with other virtual machines running on the same physical machine (e.g., a node, computer, processor, server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five.

Virtualization technology, including virtual machines may also provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system and one or more applications. An operating system (OS) is the program that, after being initially loaded into a computer by a boot program, manages other programs on the computer. The other programs (also referred to as application programs or programs) may use the operating system by making requests for services through one or more application program interfaces (APIs) of the operating system. An application may perform one or more specific functions (or tasks) directly for a user or, in some cases, another program or application program. Examples of applications include spreadsheets, word processing, browsers, databases, and the like. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a virtual appliance. The phrase "virtual appliance" refers to an example of a virtual machine that may include the application, operating system, and other items (e.g., data, drivers, and etc.) to enable simplification of the installation and the configuration process associated with running the application. An example of a virtual appliance is the MediaWiki software that powers Wikipedia, which is available as a virtual appliance. The MediaWiki appliance contains the necessary software, including operating system, database, and MediaWiki, to run a wiki installation as a so-called "black box."

SUMMARY

The subject matter disclosed herein provides methods and apparatus, including computer program products, for expanding a cluster using a clone of a node.

In one aspect, there is provided a computer-implemented method. The method may include receiving a selection representing a node of a cluster selected for cloning. An indication may be provided to the node to prepare for cloning. The indication may be provided by accessing an interface at the node. When the selection is received and the node is prepared for cloning, the cloning of the node may be initiated. In some implementations, the node comprises a virtual machine including an application.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings.

Like labels are used to refer to same or similar items in the drawings.

DETAILED DESCRIPTION

The subject matter described herein relates to a mechanism for expanding or contracting nodes of clustered application servers using virtualization technologies. In particular, the subject matter described herein provides a mechanism referred to herein as "live cloning." Live cloning provides a copy of a node of a cluster to allow the cluster to be expanded using virtualization technology, such as virtual machines and virtual appliances, rather than physically installing hardware and associated software. Live cloning refers to copying an existing virtual machine including an application (e.g., a running cluster node). The copied virtual machine and application acts as a template for another node to be provisioned, i.e., adapted for use as part of the expansion of the cluster. Moreover, the cloning may be live, i.e., during runtime, although cloning may be performed at other times as well. Although the examples described herein refer to cloning a virtual machine including a node of a cluster, the virtual machine that is cloned may include any other type of application as well. Moreover, in some implementations, the application includes an interface, such as an application programming interface, to enable a controller to notify the application to prepare for the live cloning.

In some implementation, the use of live cloning as described herein provides one or more of the following benefits; no installation sources or procedures have to be maintained by a customer and provisioning can be performed quickly, when compared to a physical installation and associated software since live cloning makes a copy from an existing "running" node. Moreover, since the live clone is created from a running node, the state of a node, such as a cluster node, may be preserved. For example, if the live clone preserves the caches of the node from which it was cloned (i.e., the parent node), the newly provisioned live clone of the cluster node may be ready to use very quickly (e.g., online and ready for use), when compared to approaches that start with an empty cache.

Figure 1:
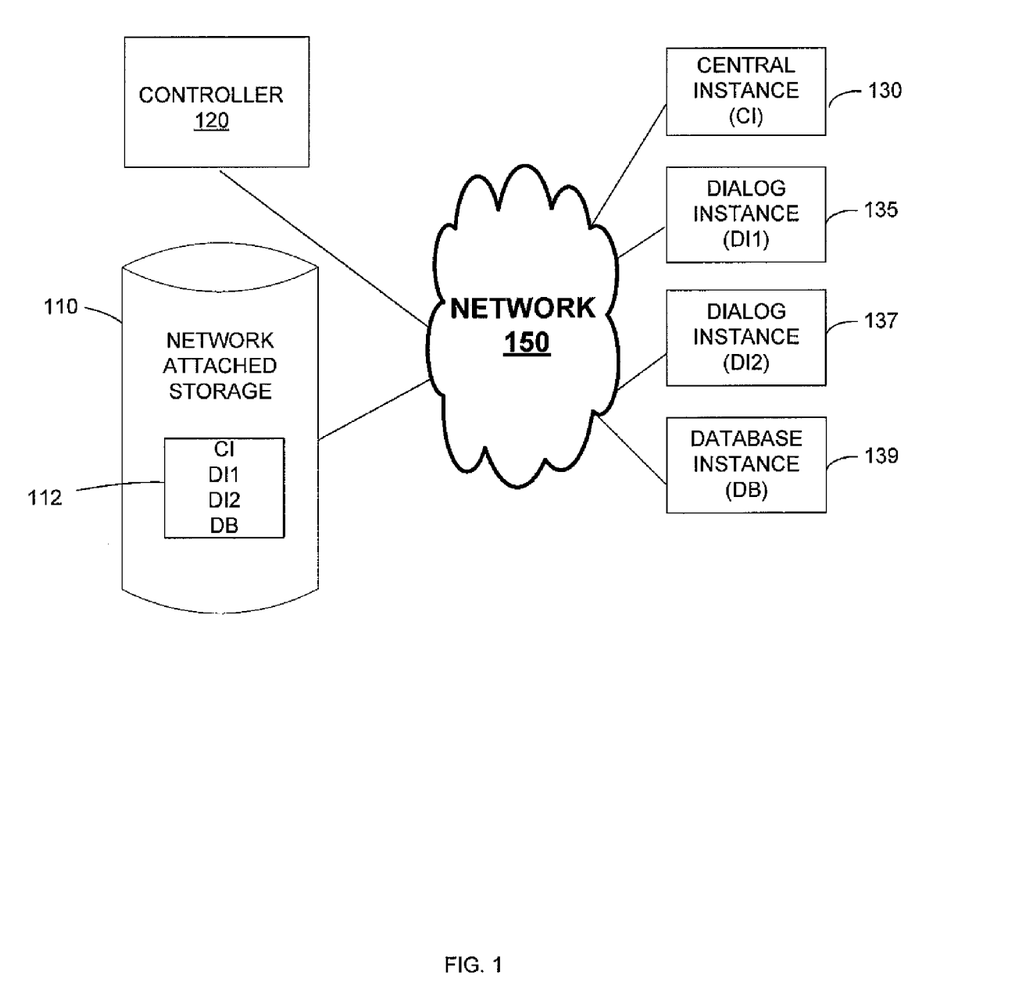
FIG. 1 depicts a block diagram of a dynamic cluster system.

FIG. 1 depicts a dynamic cluster system not implementing virtualization technology. The dynamic cluster management system includes a network attached storage 110, a controller 120 (e.g., a central instance or SAP's Adaptive Computing Controller), cluster nodes (i.e., portions of a cluster) 130-139, all of which are coupled by a communication mechanism, such as network 150 (e.g., the Internet, an intranet, and/or intra-process communications). One or more of the central instances 130, dialog instances 135 and 137, and database instance 139 may be implemented on a host, i.e., a physical machine, such as a server, a computer, a processor, a blade, and the like. Although FIG. 1 depicts a dynamic cluster system, other types of clusters and distributed computing systems may be used as well.

In some implementations, controller 120 enables the addition and removal of computing resources with minimal administrative effort. The controller 120 may also manage workloads and assign instances of applications to a computing resource. The controller 120 may also build connections between computing and storage resources, provide a transport layer for virtualization, and support different network topologies, such as TCP/IP, iSCSI, and Fibre Channel. The controller 120 may be coupled to, or include, a registry, such as SAP's system landscape directory (SLD), with information representative of the current and past state of the clusters.

In the system of FIG. 1, when an increase capacity is required, a physical machine may be installed and another application server, such as a dialog instance, may be installed as well. For example, if the system of FIG. 1 was associated with a database for looking up credit card information, as demand peaks (e.g., during different times of day or during the holidays), increased capacity may be required, at which time additional hosts and an additional dialog instance may be instantiated to augment querying for credit card information.

Network attached storage 110 provides a storage mechanism and, in particular, a shared file system (or file server). For example, network attached storage 110 may store copies of application servers 112, such as a central instances (CI), dialog instances (DI1 and DI2), and a database instance (DBI).

The central instance 130 is an application server that controls the processes within a cluster and may include a message server for communications.

The dialog instances 135 and 137 are also application servers configured on dynamic cluster system 100. The dialog instance may be an application server providing applications, such as a customer relationship management (CRM) application, an enterprise resource planning (ERP) application, a product lifecycle management application, a supply chain management (SCM) application, a supplier relationship management application, as well as any other application. For example, when a client computer accesses an SCM application at the central instance, it is dispatched to any of the dialog instances and from then on, an instance of the SCM application runs on the physical machine on which the dialog instance runs. If another client computer accesses the central instance, the SCM application may be served from a different dialog instance or from the same dialog instance. In this example, the dialog instance 135 operates as an application server that wraps each instance of the SCM application, so that the two SCM applications can run independently regardless of whether they run on the same or different nodes within the cluster. Moreover, these aforementioned dialog instances may represent complex applications, requiring complex and burdensome installation of the application, operating system, and associated data.

Dynamic cluster system 100 may also include an instance of a database instance 139 (i.e., a database application server).

Figure 2:
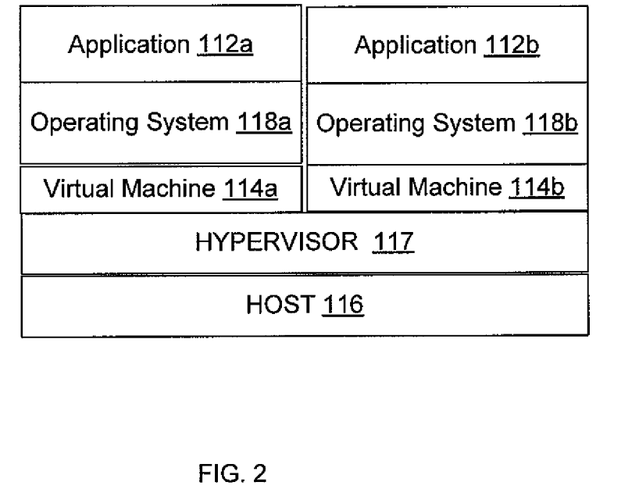
FIG. 2 depicts a block diagram of virtual machines.

FIG. 2 depicts an example implementation of virtualization technology. Referring to FIG. 2, a host 116 may be implemented as a physical machine capable of hosting one or more virtual machines, such as virtual machines 114a-b. The virtual machines 114a-b may be implemented as software for creating a virtualized system between a physical machine and its operating system. In some implementations, the virtual machines 114a-b may be implemented as a virtual appliance, which refers to a virtual machine that includes an application, an operating system and, in some cases, data to configure and/or operate the application. Moreover, the virtual machines 114a-b may each run an application 112a-b. For example, the application 112a-b may be implemented as a central instance, a dialog instance, a database instance, or any other application or application server. In some implementations, each of the applications 112a-b may have an operating system 118a-b, such as Microsoft Windows, Microsoft Vista, Java, Sun OS, Linux, or any other operating system. VMWare ESX and VMware Server are examples of hypervisor software for virtualizing an operating environment, including IP (Internet Protocol) addresses, registries, and other aspects normally used at a computer. Although FIG. 2 depicts a single host 116, two hypervisors 117, two operating systems, and two virtual machines, any number (including zero) of hosts, hypervisors, operating systems, and/or applications may be implemented as well. Host 116 may include a hypervisor to control (or manage) a physical machine's processor, memory, and other resources enabling the virtual operating environment.

Figure 3:
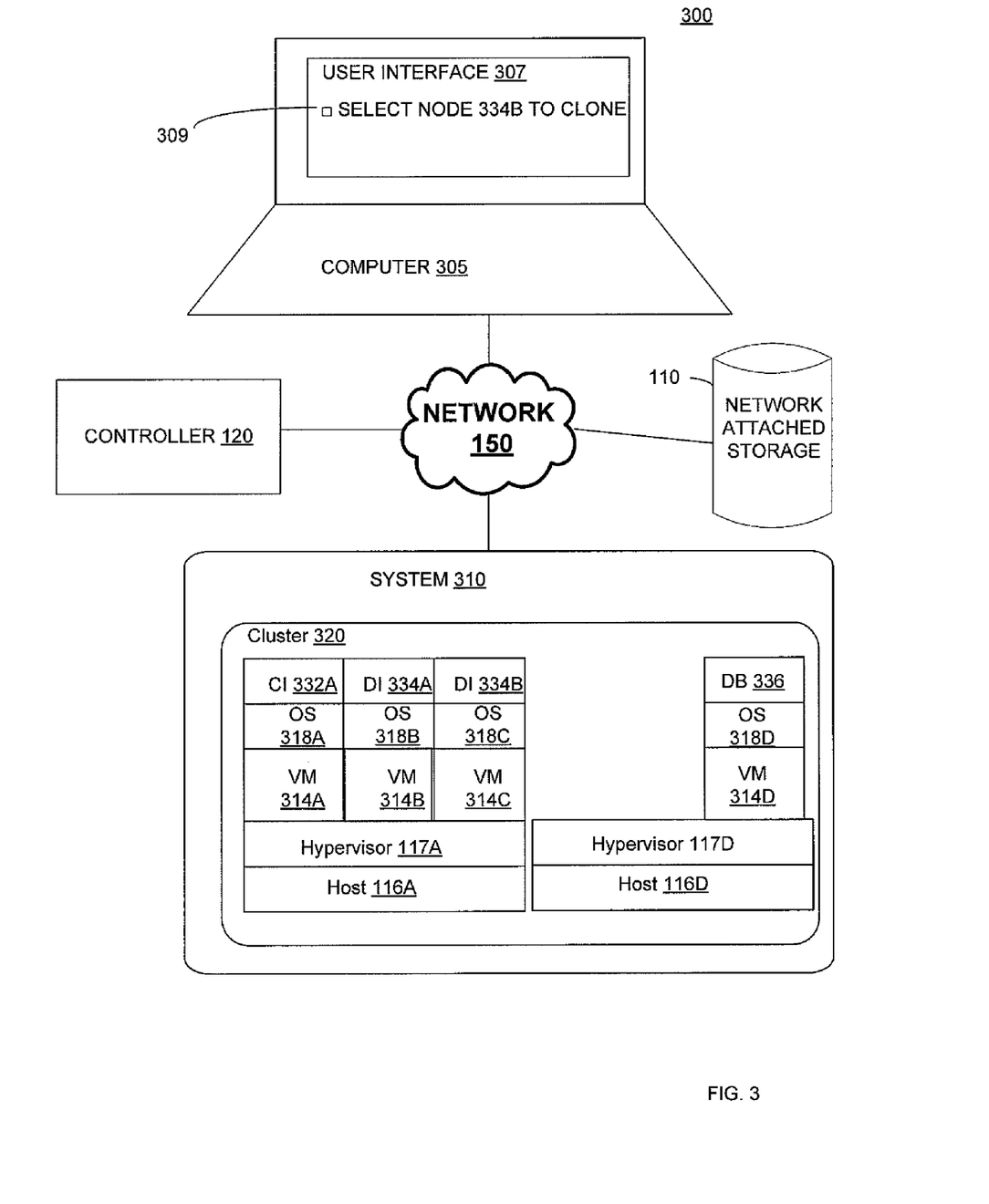
FIG. 3 depicts a system 300 including a dynamic cluster system implementing virtual machines.

FIG. 3 depicts a system 300 implemented using virtualization technology. The system 300 is similar to the system 100 of FIG. 1, but system 300 includes virtualization technology, such as virtual machines 314A-D. System 300 also includes a computer 305 and a user interface 307.

Dynamic cluster system 310 includes a cluster 320. Cluster 320 further includes a central instance 332A implemented on virtual machine (VM) 314A, dialog instance 334A implemented on virtual machine 314B, dialog instance 334B implemented on virtual machine 314C, and database instance 336 implemented on virtual machine 314D. Virtual machines 314A-C may be implemented on a physical machine, such as host 116A, while virtual machine 314D may be implemented on host 116D. The hosts may be implemented as physical machines, i.e., a server, a computer, a processor, a blade, and the like, and each host may include a hypervisor, such as hypervisors 117A and D, and an operating system (OS), such as operating systems 318A-D. The nodes of the cluster are represented by each of central instances 332A, dialog instances 334A-B, and database instance 334.

User interface 307 may be implemented as any type of interface that enables interaction with aspects of system 300, including controller 120, hypervisors 117A and D, operating systems 318A-D, virtual machines 314A-D, central instance 332, dialog instances 334A-B, and database instance 336. For example, user interface 307 may be implemented as a browser (e.g., Netscape Navigator) or a client application to interface with (and/or access) controller 120.

FIG. 3 depicts an implementation where live cloning has not been selected 309 at user interface 307. In the example of FIG. 3, a node of cluster 320 includes at least one of the following: a virtual machine and the corresponding operating system, the corresponding application, and any associated data. The associated data may include any data being used by the virtual machine, operating system, and/or application.

Figure 4:
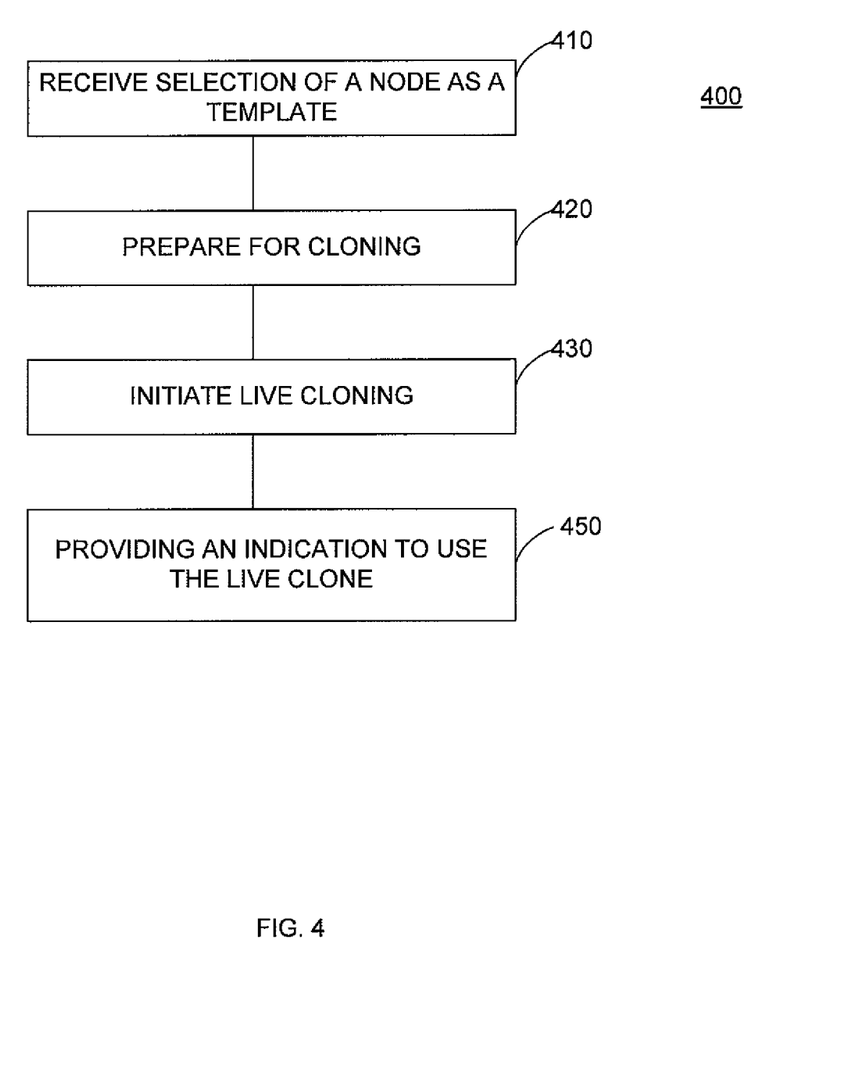
FIG. 4 depicts a process for live cloning of a virtual machine to dynamically expand or contract the system 300.

FIG. 4 depicts a process 400 for performing a live clone of a node. At 410, a node is selected as a template for the live cloning. To select a node to serve as a template, controller 120 may receive an indication of a node selected as the template for the live cloning. For example, a user at user interface 307 may select 309 (FIG. 3) a node, such as dialog instance 334B, as the template for the live cloning. The selected node thus serves as the template for the cloning. In some implementations, instead of a user selecting the node, controller 120 may initiate process 400 by selecting a node (e.g., a virtual machine and/or an application) for the live cloning. In other implementations, another component (e.g., a load balancer) provides an indication of the node selected as the template for the live cloning.

At 420, controller 120 may initiate preparation for cloning. To prepare for cloning, controller 120 may contact the selected template to prepare for cloning. For example, controller 120 may access a standard interface, such as an application program interface (API), at the node selected as the template and notify the selected template node to prepare for cloning. Specifically, controller 120 may access an API at dialog instance 334B. When that is the case, dialog instance 334B may reject any additional calls from a dispatcher, such as central instance 332A, and suspend (or terminate) a pending session. The selected template node, such as dialog instance 334B, may also forward the request to virtual machine 314C, although controller 120 may also contact virtual machine 314C directly with the prepare for cloning request. In any case, the application serving as the template, which in this example is dialog instance 334B, prepares for cloning. By enabling the dialog instance 334B to prepare for cloning, any cloning that subsequently occurs results in a so-called "graceful" cloning, when compared to merely cloning the dialog instance 334B without such preparation. For example, when allowed to prepare for cloning, the state of the application, such as dialog instance 334B, is typically in a more stable state and is ready to be executed (e.g., run and used) after immediately after cloning. The prepare to clone request may also initiate a detachment of the node selected as the template. For example, the selected node, in this example dialog instance 334B, may be detached from cluster 320. When a node is detached, the detached node will not be served any additional requests from central instance 332A, although the node may complete requests (e.g., processes or sessions) currently being executed. In some implementations, a node may reject the request to clone (e.g., the node is not capable of or not willing to clone).

At 430, controller 120 initiates the live cloning of the node. In some implementations, controller 120 initiates the live cloning after it receives from the selected template node a response indicating that the preparation to clone has taken place. For example, dialog instance 334B, virtual machine 314C, and/or hypervisor 117A may respond (e.g., by sending a message) that the cloning can take place. When cloning can take place, controller 120 may initiate cloning by instructing (e.g., sending a message) hypervisor 117A to migrate (e.g., copy) the running virtual machine 314C at hypervisor 117a to another virtual machine at another hypervisor. Moreover, controller 120 may also instruct hypervisor 117A to keep a copy of virtual machine 314C and its contents (e.g., dialog instance 334B, operating system 318c, applications, any state information, and the like). Since the entire virtual machine 314C is cloned during runtime, the cloning results in a copy including the entire contents of the virtual machine (e.g., the operating system, the application, data, any state information, and the like).

At 450, controller 120 provides an indication (e.g., a message) to enable use of the cloned node. For example, controller 120 may notify the dialog instance, virtual machine, and/or the hypervisor to begin operation as part of cluster 320. Moreover, controller 120 may also provide an indication to the hypervisor (e.g., hypervisor 117a) of the selected template (e.g., dialog instance 334B) to resume use of the selected node used as the template (e.g., reattach to the cluster and processes requests from a dispatcher, such as central instance 332A). In this example, the selected template node is dialog instance 334B, so cloning results in an additional dialog instance for processing at cluster 320. For example, when an increase capacity is required, rather than require a physical installation, the cloning provides an additional virtual machine including an application, such as a dialog instance.

Figure 5:
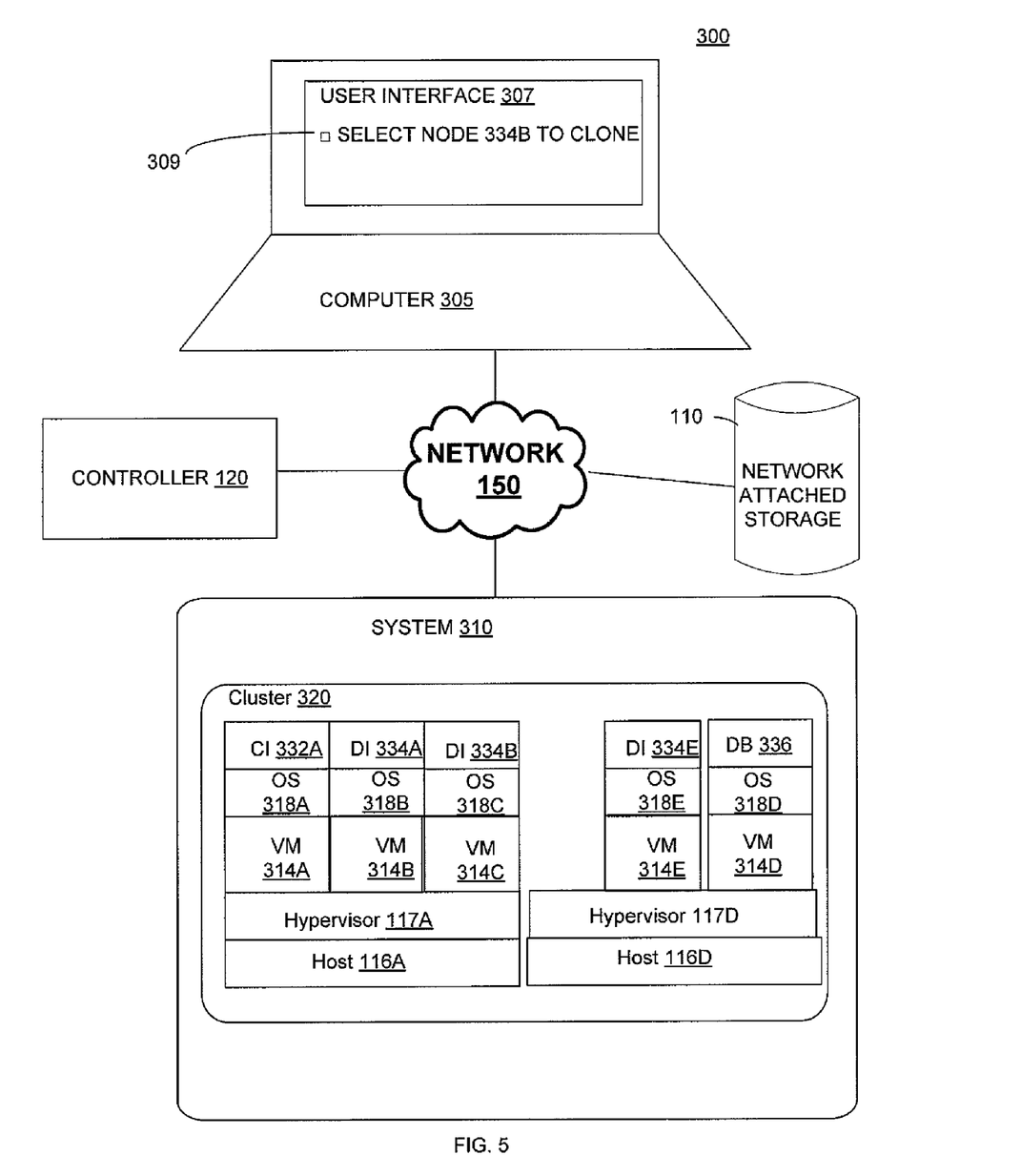
FIG. 5 depicts the system 300 after live cloning.

FIG. 5 depicts the system of FIG. 3 after a live cloning is performed using process 400. For example, dialog instance 334E, operating system 318E, and virtual machine 314E are the live clone of the selected template (e.g., dialog instance 334C, operating system 318C, and virtual machine 314C). Moreover, since the selected template was not removed from hypervisor 117A, cluster 320 now has an additional virtual machine and application for processing at cluster 320. Moreover, since the cloning is performed during runtime, the live clone (e.g., dialog instance 334E, operating system 318E, and virtual machine 314E) has a state that is closer to a real, running application, which typically enables the cloned node to become operational more quickly. Although FIG. 5 depicts adding a single cloned node, any number of nodes may be added using process 400.

Controller 120 may also detach a node and destroy a virtual machine. In some implementations, rather than waiting until the template node, selected at 410, is in a state where it can be cloned, controller 120 initiates the cloning regardless of the state of the template node. Controller 120 may also purge all sessions of the cloned node before starting the node as part of the cluster.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual machines, the virtual machines may be implemented as virtual appliances as well.

The foregoing description is intended to illustrate but not to limit the scope of the invention, which is defined by the scope of the appended claims. Other embodiments are within the scope of the following claims.

What is claimed is:

1. A computer-implemented method comprising:
receiving, at a controller, a selection from a user interface, wherein the selection represents a node selected for cloning, wherein the node comprises a virtual machine including an application;
providing, by the controller, an indication to the node to prepare for the cloning by accessing an interface at the node;
causing, by the controller, the node to detach from a cluster of nodes, wherein before being detached, the node is not served an additional processing request by the controller;
causing, by the controller, the cloning during a runtime of the node, when the selection is received and the node is prepared for the cloning, wherein before the cloning, the controller waits until the node is in a stable state to enable transitioning the application to the cloned node after the cloning; and
providing, by the controller, an indication to use the cloned node, wherein the controller is implemented by at least one processor.

2. The computer-implemented method of claim 1, wherein the accessing further comprises:
accessing, by the controller, an interface at the application to instruct the application to prepare for cloning, the preparation instruction causing the application to perform one or more of the following: terminate a session; terminate a call; reject an incoming call for additional session; and notify the controller that cloning may take place.

3. The computer-implemented method of claim 1, wherein the initiating further comprises:
initiating, by the controller, the cloning by instructing a hypervisor to copy to another hypervisor, the node comprising the virtual machine, the application, an operating system, and data associated with the application.

4. The computer-implemented method of claim 3, wherein the initiating further comprises:
instructing the hypervisor to keep a copy of the node and any contents of the node.

5. The computer-implemented method of claim 3, further comprising:
copying the node from the hypervisor to another hypervisor during runtime, the copying implemented as a migration.

6. The computer-implemented method of claim 3, further comprising:
providing, to the other hypervisor, an indication to use the copied node.

7. The computer-implemented method of claim 3 further comprising:

providing, to the hypervisor, an indication to use the node, after the node has been copied to the other hypervisor.

8. A computer-implemented method comprising:
receiving, at a controller, a selection from a user interface, wherein the selection represents a node selected for cloning, wherein the receiving further comprises using, as the node, a virtual machine comprising an application, an operating system, and data associated with the application;
providing, by the controller, an indication to the application including the node to allow the node to prepare for the cloning by accessing an interface at the application, wherein the preparation by the application includes at least one of the following: rejecting at least one call from a dispatcher, suspending a pending session during runtime, providing an indication of whether the cloning is accepted, and forwarding the indication to the virtual machine wrapping the application;
causing, by the controller, the node to detach from a cluster of nodes, wherein before being detached, the node is not served an additional processing request by the controller;
causing, by the controller, the cloning during a runtime of the node, when the selection is received and the node is prepared for the cloning, wherein before the cloning, the controller waits until the node is in a stable state to enable transitioning the application to the cloned node after the cloning; and
providing, by the controller, an indication to use the cloned node, wherein the controller is implemented by at least one processor.

9. A computer-readable storage medium including executable instructions that when executed perform operations comprising:
receiving, at a controller, a selection from a user interface, wherein the selection represents a node selected for cloning, wherein the node comprises a virtual machine including an application;
providing, by the controller, an indication to the node to prepare for the cloning by accessing an interface at the node;
causing, by the controller, the node to detach from a cluster of nodes, the node to detach from a cluster of nodes, wherein before being detached, the node is not served an additional processing request by the controller;
causing, by the controller, the cloning during a runtime of the node, when the selection is received and the node is prepared for the cloning, wherein before the cloning, the controller waits until the node is in a stable state to enable transitioning the application to the cloned node after the cloning; and
providing, by the controller, an indication to use the cloned node.

10. The computer-readable medium of claim 9, wherein the receiving further comprises:
using, as the node, the virtual machine further comprising at least one of an operating system and data associated with the application.

11. The computer-readable medium of claim 10, wherein the providing further comprises:
accessing, by the controller, another interface at the application to instruct the application to prepare for cloning.

12. The computer-readable medium of claim 11, wherein the accessing further comprises:
accessing, by the controller, the interface at the application to instruct the application to prepare for cloning, the preparation instruction causing the application to perform one or more of the following: terminate a session; terminate a call; reject an incoming call for an additional session; and notify the controller that cloning may take place.

13. The computer-readable medium of claim 9, wherein the initiating further comprises:
initiating, by the controller, the cloning by instructing a hypervisor to copy to another hypervisor, the node comprising the virtual machine, the application, an operating system, and data associated with the application.

14. The computer-readable medium of claim 13, wherein the initiating further comprises:
instructing the hypervisor to keep a copy of the node and any contents of the node.

15. The computer-readable medium of claim 13, further comprising:
copying the node from the hypervisor to another hypervisor during runtime, the copying implemented as a migration.

16. The computer-readable medium of claim 13 further comprising:
providing, to the other hypervisor, an indication to use the copied node.

17. The computer-readable medium of claim 13 further comprising:
providing, to the other hypervisor, an indication to use the node, after the node has been copied to the other hypervisor.

18. A system comprising:
a processor; and
a memory, wherein the processor and the memory are configured to perform a method comprising:
receiving, at a controller, a selection from a user interface, wherein the selection represents a node selected for cloning, wherein the node comprises a virtual machine including an application;
providing, by the controller, an indication to the node to prepare for the cloning by accessing an interface at the node;
causing, by the controller, the node to detach from a cluster of nodes, the node to detach from a cluster of nodes, wherein before being detached, the node is not served an additional processing request by the controller;
causing, by the controller, the cloning during a runtime of the node, when the selection is received and the node is prepared for the cloning, wherein before the cloning, the controller waits until the node is in a stable state to enable transitioning the application to the cloned node after the cloning; and
providing, by the controller, an indication to use the cloned node.

19. the system of claim 18, wherein the receiving further comprises:
using, as the node, the virtual machine further comprising at least one an operating system and data associated with the application.

* * * * *

UNITED STATES PATENT AND TRADEMARK OFFICE
CERTIFICATE OF CORRECTION

PATENT NO. : 8,887,158 B2  
APPLICATION NO. : 12/044888  
DATED : November 11, 2014  
INVENTOR(S) : Alexander Gebhart et al.

Page 1 of 1

It is certified that error appears in the above-identified patent and that said Letters Patent is hereby corrected as shown below:

In the Claims:

1. At column 8, line 44, claim number 2 should read, call for an additional

2. At column 8, line 60, claim number 5 should read, during the runtime

3. At column 10, line 23, claim number 15 should read, during the runtime

4. At column 10, line 60, claim number 19 should read, at least one of an operating system Signed and Sealed this  
Twenty-fourth Day of February, 2015

Michelle K. Lee  
*Deputy Director of the United States Patent and Trademark Office*